United States Patent [19]

Vasta

[11] Patent Number: 4,727,100

[45] Date of Patent: Feb. 23, 1988

[54] COATING COMPOSITION CONTAINING A REACTIVE URETHANE COMPONENT AN ACRYLIC FATTY ACID DRYING OIL RESIN AND A METALLIC ALKYLATE

[75] Inventor: Joseph A. Vasta, Wilmington, Del.

[73] Assignee: E. I. Du Pont de Nemours and Company, Wilmington, Del.

[21] Appl. No.: 897,038

[22] Filed: Aug. 15, 1986

[51] Int. Cl.$^4$ .............................................. C08G 18/40
[52] U.S. Cl. ...................................... 524/40; 524/102; 524/336; 524/337; 525/127; 528/45; 528/48; 528/58; 528/272; 528/279; 528/280; 528/282
[58] Field of Search ................. 524/102, 336, 337, 40; 525/127; 528/45, 48, 58, 272, 279, 280, 282

[56] References Cited

U.S. PATENT DOCUMENTS

| | | | |
|---|---|---|---|
| 3,558,564 | 1/1971 | Vasta | 528/58 |
| 3,622,651 | 11/1971 | Vasta | 260/856 |
| 3,719,619 | 3/1973 | Nagata et al. | |
| 3,993,848 | 11/1976 | Victorius | 528/45 |
| 3,998,768 | 12/1976 | Pettit, Jr. | 528/45 |
| 4,020,216 | 4/1977 | Miller | |
| 4,131,571 | 12/1978 | Crawley et al. | |
| 4,215,023 | 7/1980 | Strolle | 260/22 CB |
| 4,373,081 | 2/1983 | Nachtkamp et al. | 528/45 |
| 4,555,535 | 11/1985 | Bednarek et al. | 524/102 |

OTHER PUBLICATIONS

"Reactions of Diethyl Malonate Blocked Cyclohexyl Isocyanate", Wicks et al, Journal of Coatings Technology, Nov. 1977, vol. 49, No. 634, pp. 77-84.
"Malonic Ester-Blocked Aliphatic Isocyanates", Kostyk & Wicks, Journal of Polymer Science Polymer Chemistry Edition, vol. 17, 2423-2428 (1979).
"Reactions of Acetoacetic Ester Blocked Cyclohexyl Isocyanate", Wicks & Wu, Journal of Organic Chemistry, 45, 2446 (1980).
Hüls data sheet, 2297, 9/1983.

Primary Examiner—Maurice J. Welsh
Assistant Examiner—S. A. Acquah
Attorney, Agent, or Firm—Hilmar L. Fricke

[57] ABSTRACT

A coating composition useful as an exterior for automobiles and trucks and as a refinish composition containing a film forming binder and a carrier for the binder; wherein the binder contains (1) a reactive component of the formula

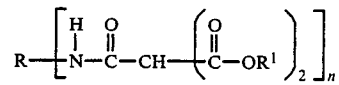

where
R is a divalent or trivalent aliphatic or cycloaliphatic group,
$R^1$ is an alkyl group having 1–4 carbon atoms
n is 2–3

(2) a hydroxy containing acrylic polymer having drying oil fatty acid moieties and a hydroxyl number of 20–500 and (3) an organo metallic alkylate selected from the group of an aluminum, titanium, zirconium alkylate, or mixtures thereof.

The composition can be applied by conventional techniques such as spraying and cures at ambient temperatures or can be baked at relatively low temperatures.

14 Claims, No Drawings

COATING COMPOSITION CONTAINING A REACTIVE URETHANE COMPONENT AN ACRYLIC FATTY ACID DRYING OIL RESIN AND A METALLIC ALKYLATE

BACKGROUND OF THE INVENTION

This invention is related to a coating composition that is useful for finishing and refinishing automobiles and trucks.

Acrylic polyurethane coating compositions for automobiles and trucks are well known in the art. An acrylic polyurethane composition described in Vasta U.S. Pat. No. 3,558,564 issued Jan. 26, 1971 has been widely used for finishing and refinishing automobiles and trucks. Other high quality acrylic polyurethane finishes used for automobiles and trucks are shown in U.S. Pat. Nos. 4,131,571 Crawley et al., issued Dec. 26, 1978, and 4,555,535 Bednarek et al. issued Nov. 26, 1985.

A coating composition that is free from reactive isocyanate groups but will crosslink and cure at ambient temperatures in a short time period or that can be baked at relatively low temperatures and in either case will form a glossy, durable, hard, weatherable finish will have many uses and in particular is useful for finishing and refinish automobiles and trucks. Such a composition will be particularly useful for finishing plastic parts or laminate structures that are being used for autos and trucks and that readily deform when exposed to elevated temperatures. In each model year, the amount of plastic parts and laminated structures used in cars and trucks becomes larger thereby increasing the need for a composition that will cure at ambient or low temperatures and provide a high quality finish acceptable to the automotive industry.

SUMMARY OF THE INVENTION

A coating composition containing a film forming binder and a carrier for the binder; wherein the binder consists essentially of (1) a reactive component of the formula

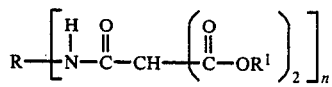

where
R is a divalent or trivalent aliphatic or cycloaliphatic group,
$R^1$ is an alkyl group having 1-4 carbon atoms
n is 2-3

(2) a hydroxy containing acrylic polymer having drying oil fatty acid moieties and having a hydroxyl number of 20-200

(3) an organo metallic alkylate catalyst selected from the group of aluminum, titanium, zirconium alkylates or mixtures thereof.

DETAILED DESCRIPTION OF THE INVENTION

The coating composition of this invention does not contain free isocyanate groups and forms a high quality, glossy, hard, durable and weatherable finish that has excellent adhesion to primed metal substrates and rigid and flexible plastic substrates. The composition cures at ambient temperatures or can be baked at relatively low temperatures of about 50°-100° C. Depending on the substrate, higher temperatures such as up to 150° C. can be used.

The composition can be used for an exterior original equipment finish for automobiles and trucks since the composition can be applied by conventional techniques such as spraying or electrostatic spraying and can be cured at low baking temperatures or at ambient temperatures. The composition is particularly useful for finishing plastic parts used in automobiles and trucks since elevated temperatures which deform the plastic parts are not used. Also, the aforementioned characteristics make the composition very useful for refinishing automobiles and trucks since many refinish operations do not have baking facilities or only low temperature baking facilities.

The coating composition preferably has a film forming binder content of about 10-80%, by weight and correspondingly, contains about 20-90%, by weight of an organic carrier which preferably, is a solvent for the binder. A high solids coating composition can be formed that has a solids content of about 50-80% by weight of binder and about 20-50% by weight of an organic solvent for the binder.

Preferably, the binder of the coating composition contains about (1) 5-38% by weight, based on the weight of the binder, of the reactive polyurethane, (2) 60-94.99% by weight, based on the weight of the binder, of the hydroxyl containing acrylic polymer and (3) 0.01-2% by weight, based on the weight of the binder, of the organo metallic alkylate catalyst.

The reactive component is formed by reacting all of the isocyanate groups of an aliphatic or cycloaliphatic polyisocyanate with a dialkyl malonate. The above constituents are mixed with conventional solvents and reacted at about 50°-200° C. for about 0.5-4 hours to form the reactive component.

Typical dialkyl malonates that can be used are dimethyl malonate, diethyl malonate, dipropyl malonate, diisopropyl malonate, dibutyl malonate, diisobutylmalonate, methyl ethyl malonate and the like. Diethyl malonate is preferred for forming a high quality reactive polyurethane.

Typical aliphatic and cycloaliphatic polyisocyanates that can be used to form the reactive component are as follows: isophorone diisocyanate which is 3-isocyanatemethyl-3,3,3-trimethylcyclohexyl-isocyanate, propylene-1,2-diisocyanate, butylene-1,2-diisocyanate, butylene-1,3-diisocyanate, hexamethylene diisocyanate, octamethylene diisocyanate, 2,4,4-trimethylhexamethylene diisocyanate, nonamethylene diisocyanate, 2,2,4-trimethylhexamethylene diisocyanate, decamethylene diisocyanate, 2,11-diisocyano-dodecane and the like; 2,2'-methylene-bis-(cyclohexyl isocyanate), 3,3'-methylene-bis-(cyclohexyl isocyanate), 4,4'-methylene-bis-(cyclohexyl isocyanate), 4,4'-ethylene-bis-(cyclohexyl isocyanate), 4,4'-propylene-bis-(cyclohexyl isocyanate), biurets such as

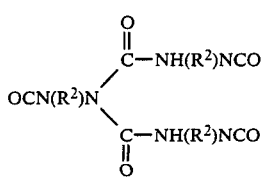

wherein $R^2$ is an aliphatic hydrocarbon group having 1–12 carbon atoms. One particularly preferred biuret is the biuret of hexamethylene diisocyanate. These biurets can be made according to Mayer et al. U.S. Pat. No. 3,245,941, issued Apr. 12, 1966.

Trimers of aliphatic or cycloaliphatic diisocyanate can be used. One particularly preferred polyisocyanate that forms a high quality durable and weatherable finish is

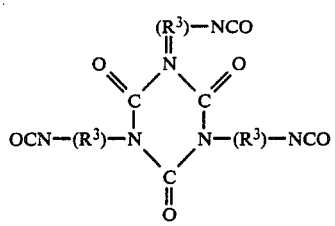

wherein $R^3$ is an aliphatic or cycloaliphatic hydrocarbon group. One preferred trimer is formed with isophorone diisocyanate. The above polyisocyanate is 1,3,5-tris(6-isocyanatohexyl) 1,3,5-triazine 2,4,6(H,3H,5H) trione. Commercially available polyisocyanate compositions contain the above polyisocyanate and small amounts of higher molecular weight moieties such as dimers and hexamers of the above polyisocyanate.

One particularly preferred reactive component is formed from the trimer of hexamethylene diisocyanate and diethyl malonate.

The hydroxyl containing acrylic polymer has a hydroxyl number of about 20–200 and preferably, about 50–150. The polymer has a weight average molecular weight of about 1,000–50,000, preferably about 5,000–20,000.

Molecular weight is determined by gel permeation chromatography using polymethyl methacrylates as a standard.

One particularly useful hydroxyl containing polymer has a backbone of polymerized ethylenically unsaturated monomers, hydroxy alkyl acrylate or methacrylate monomers and glycidyl acrylate or methacrylate monomers. Side chains of drying oil fatty acids are attached to the backbone through a reaction with the glycidyl groups of the backbone.

The polymer is prepared by using standard solution polymerization techniques in which monomers for the polymer backbone are charged into a conventional polymerization vessel with an appropriate solvent, polymerization catalyst and heated to about 75°–200° C. for about 0.5–5 hours to form the polymer backbone. Then drying oil fatty acids are added with an appropriate esterification catalyst and the resulting reaction mixture is heated to about 130° C.–250° C. for about 1–3 hours or until an acid number of the resulting polymer is less than 15, usually less than 5. Water from the reaction is removed from the vessel during the reaction.

Typically useful polymerization catalysts are azobisisobutyronitrile, 2,2azobis(2,4-dimethylvaleronitrile), benzoyl peroxide, ditertiary butyl peroxide, tertiary butyl hydroperoxide t-butyl peracetate, and t-butyl peroxy pivalate and the like.

Typically useful solvents that can be used to prepare the polymer are methyl ethyl ketone, methyl isobutyl ketone, toluene, acetone, butyl acetate, ethylene glycol monoethyl ether acetate, propylene glycol monomethyl ether acetate, xylene and other high boiling aromatic solvents.

Typical esterification catalysts are dibutyl tin oxide, barium oxide, barium hydroxide, calcium hydroxide, alkyl ammonium hydroxide such as tetrabutyl ammonium hydroxide, calcium oxide, barium naphthenate, lithium oxide, lithium hydroxide, zinc oxide, dibutyl tin dilurate and the like.

Typical monomers used to prepare the backbone of the polymer are as follows: styrene, acrylonitrile, methacrylonitrile, alkyl methacrylates having 1–12 carbon atoms in the alkyl group such as methyl methacrylate, ethyl methacrylate, propyl methacrylate, butyl methacrylate, isobutyl methacrylate, pentyl methacrylate, hexyl methacrylate, 2-ethylhexyl methacrylate, nonyl methacrylate, lauryl methacrylate and the like, alkyl acrylates having 1–12 carbon atoms in the alkyl groups such as methyl acrylate, ethyl acrylate, propyl acrylate, butyl acrylate, pentyl acrylate, hexyl acrylate, 2-ethylhexyl acrylate, nonyl acrylate, lauryl acrylate and the like, and mixtures of the above monomers.

Typical hydroxyl containing monomers used to prepare the polymer are hydroxy alkyl methacrylates or acrylates each having 2–4 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and mixtures of the above. Other hydroxy alkyl acrylates and methacrylates that can be used are 2-hydroxy ethyl-2-ethyl acrylate, 2-hydroxy ethyl-2-butyl acrylate, 3-hydroxy propyl-2-propyl acrylate, 3-hydroxy propyl-2-butyl acrylate, 3-hydroxy butyl-2-ethyl acrylate, 3-hydroxy butyl-2-butyl acrylate, 4-hydroxy butyl-2-butyl acrylate 2-hydroxy ethyl-2-ethyl methacrylae and mixtures of the above monomers.

Typically useful drying oil fatty acids are soya oil fatty acids, dehydrated castor oil fatty acids, linseed oil fatty acids, tung oil fatty acids, safflower oil fatty acids, sunflower seed oil fatty acids. These fatty acids are mixtures of the following unsaturated acids: oleic acid, linoleic acid, linolenic acid, eletrostearic acid, ricinoleic acid and dehydrated ricinoleic acid. Synthetic mixtures of these acids can be used such as oleic acid, linoleic acid and conjugated linoleic acid. Preferred are dehydrated castor oil fatty acids and linoleic acid.

One useful polymer has a backbone of styrene, methyl methacrylate, hydroxy ethyl acrylate, glycidyl methacrylate with side chains of dehydrated castor oil fatty acids.

Another useful polymer has a backbone of styrene, methyl methacrylate, glycidyl methacrylate and side chains of linoleic acid.

The polymer can contain in addition up to about 10% by weight based on the weight of the polymer, of a glycidyl ester of the formula

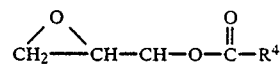

where $R^4$ is an aliphatic hydrocarbon group, preferably a tertiary aliphatic hydrocarbon group having 8-10 carbon atoms. This preferred glycidyl ester is sold under the trade name "Cardura" E glycidyl ester. Other epoxy containing monomers may be used such as ethylene oxide, butylene oxide, phenyl glycidyl ether and cyclohexene oxide. Also, multifunctional epoxy monomers can be used.

The epoxide group of the ester or the epoxy compound reacts with any residual carboxyl groups of the polymer and controls molecular weight of the polymer and prevent dimerization or trimerization of the polymer.

To enhance the polymer about 0.01-1% by weight of polyamine can be added having the formula

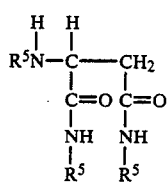

where $R^5$ is $R^6 NH_2$, and $R^6$ is an aliphatic or cycloaliphatic hydrocarbon radical.

The polyamine (1) is prepared by reacting 1 mole of dialkyl maleate with 3 moles of an aliphatic or cycloaliphatic amine at about 100°-150° C. for about 1-6 hours. Alkanol formed in the reaction is removed. Preferred reaction conditions are about 110°-130° C. for about 2-4 hours. Preferably, the above constituents are in an alkanol solvent such as methanol, propanol isopropanol and the like.

One preferred polyamine is the reaction product of 3 moles of isophorone diamine and 1 mole of dimethyl maleate.

The organo metallic alkylate catalyst generally is used in an amount of about 0.01-2% by weight based on the weight of the binder in the coating composition. The metallic alkylate has the formula $M(OR^8)_n$ where M is a metal selected from the group of titanium, zirconium and aluminum, $R^8$ is an alkyl group having 1-8 carbon atoms and n is 3 or 4. Typical catalysts are zirconium alkylate such as zirconium tetra isobutoxide and zirconium tetrabutoxide, titanium alkylate such as titanium tetra isobutoxide and titanium tetra butoxide, aluminum alkylate such as aluminum triisobutoxide. Mixtures of any of the aforementioned alkylates can be used to effect different cure rates. One particularly useful catalyst is a mixture of an aluminum alkylate such as aluminum triisobutoxide and an aluminum alkyl ester such as aluminum triethyl acetoacetate.

To provide for practical drying times at ambient or low temperatures, organo metallic driers can be added to the coating composition in amounts of about 0.01-1% by weight, based on the weight of the binder of coating composition. Typical metallic driers are based on cobalt, copper, lead, zirconium, calcium, iron, nickel, tin, zinc, lithium and the like and are cobalt naphthenate, copper naphthenate, calcium naphthenate, iron naphthenate, lithium naphthenate, nickel octoate zirconium octoate, cobalt octoate, iron octoate, zinc octoate, alkyl tin dilaurates such as dibutyl tin dilaurate and the like. Cobalt driers are preferred since these driers increase solvent resistance of a finish in relatively short drying times.

One preferred combination of organo metallic alkylate and organo metallic driers is aluminum tri-isobutoxide, cobalt octoate and zirconium octoate.

To slow the reaction rate of the composition and increase pot life small amounts of 2,4-pentane dion (acetyl acetone) can be added. Typically about 1.0 to 5.0% by weight based on the weight of the binder is added.

The coating composition is usually pigment. Pigments are added in a pigment to binder weight ratio of about 0.5/100 to 200/100 where the binder is the film forming polymer constituent of the coating composition. The pigments are usually dispersed with a resin to form a pigment dispersion. The aforementioned polymer or another compatible dispersion resin can be used. The pigment dispersion is then added to the coating composition.

Typical pigments that are used in the coating composition are metallic oxides such as titanium dioxide, iron oxide, zinc oxide, and the like, metallic flakes such as aluminum flake, bronze flake, nickel flake, metallic powders, metallic hydroxide, phthalocyanine pigments. "Monastral" pigments, molybdate pigments such as molybdate orange pigment, quinacridone pigments, sulfate pigments, carbonate pigments, carbon black pigments, silica pigments and other organic and inorganic pigments commonly used in coatings.

The coating composition is applied to a substrate by conventional techniques such as spraying, electrostatic spraying, brushing, dipping, roller coating, coil coating and the like. The coating composition can be applied to treated and untreated metal substrates, primed metal substrates, phosphatized steel substrates, primed phosphatized steel substrates, plastic substrates, reinforced injection molded substrates, polyamide substrates and the like. After application to a substrate, the resulting coating dries to a tack free condition in several minutes up to about 2 hours depending on the volatility of solvents in the composition and on ambient temperatures. The resulting coated article then can be handled and further processed. Curing of the coating continues at ambient temperature for about one week to achieve optimum physical properties. The coating can be baked at about 50°-100° C. to accelerate drying and curing. Higher temperatures can be used depending on the substrate. Finishes of the dried and cured coating are about 0.5-5 mils in thickness.

The composition can be a clear non-pigmented composition that is applied over a pigmented finish and then dried to form a clear coat/color coat finish. Also, the color coat can be the pigmented composition of this invention. To improve weatherability of the clear finish of the coating composition, and also of the pigmented finish, about 0.1-5%, by weight, based on the weight of the binder, of a light stabilizer or a combination of ultraviolet light absorbers and stabilizers can be added. These stabilizers include ultraviolet light absorbers, screeners, quenchers such as hindered amine light stabilizers. Also, about 0.1-5% by weight, based on the weight of the binder, of an antioxidant can be added.

The following examples illustrate the invention. All parts and percentages are on a weight bases unless indicated otherwise. Molecular weights (Mw) are determined by gel permeation chromatography using polymethyl methacrylate as the standard.

EXAMPLE 1

The following constituents were charged into a polymerization vessel equipped with a stirrer, an addition funnel, a reflux condenser, a thermometer, and a heating source:

| Portion | Parts by Weight |
|---|---|
| Xylene | 1006.15 |
| Portion 2 | |
| Styrene monomer | 321.11 |
| Methyl methacrylate monomer | 610.11 |
| Hydroxyethyl acrylate monomer | 107.04 |
| Glycidyl methacrylate monomer | 460.26 |
| Tertiary butyl peracetate | 62.44 |
| Tertiary butyl peracetate | 8.92 |
| Portion 3 | |
| Dehydrated castor fatty acids (C 9-11 drying oil fatty acids) | 642.22 |
| Tetrabutylammonium hydroxide | 3.46 |
| Portion 4 | |
| PM acetate (Propylene glycol monomethyl ether acetate) | 278.30 |
| Total | 3500.00 |

Portion 1 was charged into a polymerization and heated to its reflux temperature. The monomers of Portion 2 were premixed along with the first portion of peracetate catalyst and then added to the polymerization vessel over a three hour period with constant stirring while maintaining the resulting reaction mixture at its reflux temperature. The second portion of peracetate was added and the reaction mixture was held at its reflux temperature for an additional three hours. Portion 3 was premixed and added rapidly and then the reaction mixture was heated to its reflux temperature and held at this temperature until an acid number of three was reached. Heating of the reaction mixture was stopped and the mixture was cooled to room temperature and Portion 4 was added.

The resulting polymer solution had a solids content of 61.26%, an acid number of 2.12, a hydroxyl number of 125, a Gardner Holt viscosity measured at 25 C of X-Y. The polymer contains 15.0% styrene, 28.5% methyl methacrylate, 5.0% hydroxy ethyl acrylate, 21.5% glycidyl methacrylate, and 30.0% dehydrated castor oil fatty acids.

The polymer has a weight average molecular weight of about 10,000 and a number average molecular weight of about 2,020.

A coating composition was prepared as follows:

| | Parts by Weight |
|---|---|
| Portion 1 | |
| Titanium dioxide pigment | 70.00 |
| Polymer solution (prepared above) | 146.67 |
| Reactive component solution (75% solids in xylene/PM acetate of the reaction product of diethyl malonate and trimer of hexamethylene diisocyanate) | 20.00 |
| Methyl ethyl ketoxime | 0.99 |
| Cobalt octoate solution (12% solution in naphtha spirits of cobalt) | 0.42 |
| Zirconium Manosec solution (12% solution in naphtha spirits) | 0.28 |
| Toluene | 15.00 |
| Butyl acetate | 15.00 |
| Fluoride FC 430 flow agent (2% solution in xylene of a fluorosilicone) | 2.50 |
| Portion 2 | |
| ALUSEC 588 (80% solution in isobutanol of aluminum tri-isobutoxide and aluminum triethyl aceto acetate) | 1.41 |
| Acetyl acetone | 1.75 |
| Total | 269.01 |

Portion 1 was charged into a ball mill and ground for 36 hours and then removed from the mill and Portion 2 was added and thoroughly mixed with Portion 1. The resulting coating composition had a solids content of 67.38%

The coating composition was reduced to a spray viscosity of 30 seconds measured with a TM 2 Zahn cup with a 50/50 mixture of methyl ethyl ketone and toluene. The coating composition was sprayed onto two sets of plastic panels and steel panels that were each primed with an epoxy primer and one set of coated plastic and steel panels was dried at ambient temperatures for 24 hours. The resulting finish on each panel had a good gloss, was hard and solvent resistant and had a knoop hardness of 5. The second set of panels was baked at 65° C. for 1 hour. The resulting finish on each panel had a good gloss, was hard and solvent resistant. The panels had a hardness of 10 knoops and was resistant to methyl ethyl ketone solvent.

A second coating composition was prepared using the above constituents except the following constituents were used for Portion 2: titanium tetraisobutoxide 0.50 parts by weight and acetyl acetone 1.75 parts by weight.

The coating composition was reduced to a spray viscosity as above and sprayed onto plastic panels and primed steel panels described above. One set of panels was dried at ambient temperatures for 24 hours and the other set was baked at 65° C. for 1 hour. The resulting finish on each of the panels was glossy, hard and solvent resistant.

A third coating composition was prepared using the above constituents except the following constituents were used for Portion 2: zirconium tetraisobutoxide 0.50 parts by weight and acetyl acetone 1.75 parts by weight.

The coating composition was reduced to a spray viscosity as above and sprayed onto plastic panels and primed steel panels described above. One set of panels was dried at ambient temperatures for 24 hours and the other set was baked at 65° C. for 1 hour. The resulting finish on each of the panels was glossy, hard and solvent resistant.

EXAMPLE 2

A polymer solution was prepared by charging the following constituents into a polymerization vessel equipped as in Example 1:

| | Parts by Weight |
|---|---|
| Portion 1 | |
| Xylene | 1081.16 |
| Portion 2 | |
| Styrene monomer | 307.39 |
| Methyl methacrylate monomer | 720.28 |
| Glycidyl methacrylate monomer | 360.39 |
| Ditertiary butyl peroxide | 63.60 |
| Portion 3 | |
| Linoleic acid | 647.64 |

-continued

| | Parts by Weight |
|---|---|
| DBU catalyst (reaction product of 3 moles of isophorone diamine and 1 mole of dimethyl maleate) | 1.06 |
| Portion 4 | |
| PM acetate solvent | 317.99 |
| (described in Example 1) | |
| Total | 3500.00 |

Portion 1 was charged into the polymerization vessel and heated to its reflux temperature of 138° C. Portion 2 was premixed and slowly added over a four hour period and the resulting reaction mixture was held at its reflux temperature for an additional two hours. Portion 3 was premixed and added rapidly and then heated to reflux temperature and held at this temperature until and acid number of 3 was reached. Heat was removed and the resulting polymer solution was cooled to 50° C. and then Portion 4 was added.

The polymer solution had a solids content of 60.02%, a Gardner Holdt viscosity of Z4–Z5 and acid number of 6 and a hydroxyl number of 80 polymer contains 15.1% styrene, 35.4% methyl methacrylate, 17.7% glycidyl methacrylate and 31.81% linoleic fatty acids. The polymer has a weight average molecular weight of about 41,000 and a number average molecular weight of about 8,400.

A coating composition was prepared as follows:

| | Parts by Weight |
|---|---|
| Portion 1 | |
| Titanium dioxide pigment | 70.00 |
| Polymer solution (prepared above) | 141.67 |
| Reactive component solution | 20.00 |
| (described in Example 1) | |
| Methyl ethyl ketoxime | 0.99 |
| Cobalt octoate solution | 0.42 |
| (described in Example 1) | |
| Zirconium Manosec solution | 0.28 |
| (described in Example 1) | |
| Toluene | 15.00 |
| Butyl acetate | 15.00 |
| Fluoride FC 430 flow agent | 2.50 |
| (described in Example 1) | |
| Portion 2 | |
| ALUSEC 588 Aluminum alkoxide | 1.41 |
| (described in Example 1) | |
| Acetyl acetone | 1.75 |
| Total | 269.01 |

Portion 1 was charged into a ball mill and ground for 36 hours and then removed from the mill and Portion 2 was added and thoroughly mixed with Portion 1. The resulting coating composition had a solids content about 65%. The coating was reduced to a spray viscosity as in Example 1 and sprayed onto two sets of primed steel panels and plastic panels. One set of panels was dried at ambient temperatures and a second set was baked at 65° C. for 1 hour. The resulting finish on each of the panels has glossy, hard and had good solvent resistance.

I claim:

1. A coating composition containing about 10–80% by weight of a film forming binder and about 20–90% by weight of an organic solvent; wherein the binder consists essentially of about (1) 5–38% by weight, based on the weight of the binder, of a reactive component of the formula

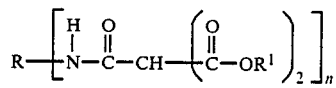

where
R is a divalent or trivalent aliphatic or cycloaliphatic group,
$R^1$ is an alkyl group having 1–4 carbon atoms
n is 2–3;

(2) 60–94.99% by weight, based on the weight of the binder of a hydroxy containing acrylic polymer having drying oil fatty acid moieties and a hydroxyl number of 20–200, said polymer having a weight average molecular weight of about 5,000 to 20,000 and having a backbone of polymerized ethylenically unsaturated monomers, hydroxy alkyl acrylate or methacrylate monomers and glycidyl acrylate or methacrylate monomers and side chains attached to the backbone of drying oil fatty acids being reacted with glycidyl groups of the backbone (3) 0.01–2.0% by weight, based on the weight of the binder, of an organo metallic catalyst selected from the group consisting of aluminum alkylate, titanium alkylate, zirconium alkylate and mixtures thereof; said composition being cureable at ambient temperatures without the formation of free isocyanate groups during curing.

2. The coating composition of claim 1 containing pigment in a pigment to binder ratio of 0.1/100 to 500/100.

3. The coating composition of claim 1 in which the organo metallic alkylate catalyst consists essentially of a mixture of an aluminum alkylate and aluminum alkyl ester.

4. The coating composition of claim 1 in which the organo metallic catalyst consists of titanium alkylate.

5. The coating composition of claim 1 in which the organo metallic catalyst consists essentially of zirconium alkylate.

6. The coating composition of claim 1 containing in addition about 0.01–1% by weight, based on the weight of the binder, of an organo metallic drier.

7. The coating composition of claim 1 containing in addition about 0.01–1% by weight, based on the weight of the binder of a polyamine having the formula

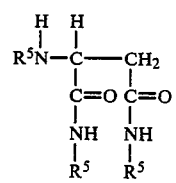

wherein $R^5$ is $R^6NH_2$, $R^6$ is an aliphatic or cycloaliphatic hydrocarbon radical.

8. The coating composition of claim 1 in which R of the reactive component is a divalent aliphatic group having 2–8 carbon atoms, $R^6$ is an alkyl having 2–4 carbon atoms, and n is 2.

9. The coating composition of claim 1 in which the hydroxy containing polymer has a backbone of polymerized monomers of styrene, methyl methacrylate, hydroxy ethyl acrylate and glycidyl methacrylate that provide glycidyl groups and side chains of dehydrated castor oil fatty acids which are attached to the backbone through a reaction with the glycidyl groups.

10. The coating composition of claim 9 in which the organo metallic alkylate catalyst consists essentially of a mixture of aluminum alkylate and aluminum alkyl ester and contains in addition about 0.01–1% by weight based on the weight of the binder, of cobalt and zirconium organo metallic driers.

11. The coating composition of claim 9 in which the organic metallic alkylate catalyst consists essentially of titanium isobutoxide and contains in addition about 0.01–1% based on the weight of the binder, of cobalt and zirconium organo metallic driers.

12. The coating composition of claim 1 in which the hydroxy containing polymer has a backbone of polymerized monomers of styrene, methyl methacrylate, glycidyl methacrylate that provides reactive glycidyl groups and side chains of linoleic acid which are attached to the backbone through a reaction with the glycidyl groups.

13. The coating composition of claim 12 in which the organo metallic catalyst consists essentially of a mixture of aluminum alkylate and aluminum alkyl ester and contains in addition about 0.01–1% by weight, based on the weight of the binder, of cobalt and zirconium organo metallic driers.

14. A substrate coated with a layer of the composition of claim 1.

* * * * *